(12) United States Patent
Chandrasekaran et al.

(10) Patent No.: US 9,732,746 B2
(45) Date of Patent: Aug. 15, 2017

(54) FLUID END OF A HIGH PRESSURE PLUNGER PUMP

(71) Applicant: GARDNER DENVER, INC., Milwaukee, WI (US)

(72) Inventors: Arun Nahendra Raj Chandrasekaran, Broken Arrow, OK (US); Christopher Douglas Degginger, Broken Arrow, OK (US); Gregory David Hash, Broken Arrow, OK (US)

(73) Assignee: GARDNER DENVER, INC., Milwaukee, WI (US)

(*) Notice: Subject to any disclaimer, the term of this patent is extended or adjusted under 35 U.S.C. 154(b) by 0 days.

(21) Appl. No.: 15/155,540

(22) Filed: May 16, 2016

(65) Prior Publication Data
US 2016/0258432 A1   Sep. 8, 2016

Related U.S. Application Data (63) Continuation of application No. 13/773,271, filed on Feb. 21, 2013, now abandoned, which is a
(Continued)

(51) Int. Cl.
*F04B 53/16* (2006.01)
*F04B 53/00* (2006.01)
(Continued)

(52) U.S. Cl.
CPC .......... *F04B 53/007* (2013.01); *F04B 39/125* (2013.01); *F04B 53/1032* (2013.01);
(Continued)

(58) Field of Classification Search
CPC .. F16K 15/026; Y10T 137/7934; F04B 53/16; F04B 53/007; F04B 53/1032; F04B 39/125
See application file for complete search history.

(56) References Cited

U.S. PATENT DOCUMENTS

| 4,520,837 A | 6/1985 | Cole et al. |
| 4,520,842 A | 6/1985 | Elliott |

(Continued)

OTHER PUBLICATIONS

Item A (1 page), a prior art section of a fluid end with a prior art twist-in springretainer, previously erroneously submitted as "twist twist in pipe spring retainer", publicly available prior to Oct. 5, 2012,1 page.*

(Continued)

*Primary Examiner* — Bryan Lettman
(74) *Attorney, Agent, or Firm* — Michael Best & Friedrich LLP (57) ABSTRACT

A fluid end of a pump includes a casing defining a plurality of working spaces that each include an inlet bore, an outlet bore, a plunger bore, and a valve cover bore. The bores define a cross bore intersection space, and an inlet bore transition area at the intersection of the inlet bore and the cross bore intersection space. A first V-shaped groove and a second V-shaped groove are formed adjacent the inlet bore transition area with each extending partially around the inlet bore axis. An inlet spring retainer includes first and second engagement portions and is orientable in a first orientation in which the retainer is movable from the inlet bore to the plunger bore and a second orientation in which the retainer engages the first and second V-shaped grooves to inhibit movement of the retainer from the inlet bore to the cross bore intersection space.

8 Claims, 9 Drawing Sheets

Related U.S. Application Data continuation-in-part of application No. 13/646,170, filed on Oct. 5, 2012, now abandoned.

(60) Provisional application No. 61/704,905, filed on Sep. 24, 2012.

(51) Int. Cl.
  *F04B 39/12* (2006.01)
  *F16K 15/02* (2006.01)
  *F04B 53/10* (2006.01)

(52) U.S. Cl.
  CPC .......... *F04B 53/16* (2013.01); *F16K 15/026* (2013.01); *Y10T 137/7934* (2015.04)

(56) References Cited

U.S. PATENT DOCUMENTS

| | | |
|---|---|---|
| 6,241,492 B1 | 6/2001 | Pacht |
| 6,382,940 B1 | 5/2002 | Blume |
| 6,544,012 B1 | 4/2003 | Blume |
| 6,623,259 B1 | 9/2003 | Blume |
| 6,910,871 B1 | 6/2005 | Blume |
| 7,186,097 B1 | 3/2007 | Blume |
| 7,335,002 B2 | 2/2008 | Vicars |
| 7,341,435 B2 | 3/2008 | Vicars |
| 7,364,412 B2 | 4/2008 | Kugelev et al. |
| 7,506,574 B2 | 3/2009 | Jensen et al. |
| 7,513,759 B1 | 4/2009 | Blume |
| 7,681,589 B2 | 3/2010 | Schwegman |
| 7,954,510 B2 | 6/2011 | Schwegman |
| 7,984,671 B2 | 7/2011 | Jensen et al. |
| 8,074,679 B2 | 12/2011 | Jensen et al. |
| 2007/0295411 A1* | 12/2007 | Schwegman ......... F16K 15/063 137/542 |
| 2008/0152523 A1 | 6/2008 | Jensen et al. |
| 2010/0288958 A1 | 11/2010 | Vicars |
| 2011/0206546 A1 | 8/2011 | Vicars |

OTHER PUBLICATIONS

"Item A (1 page), a prior art section of a fluid end with a prior art twist-in springretainer, previously erroneously submitted as twist twist in pipe spring retainer", publicly available prior to Oct. 5, 2012, 1 page.

"Item B (2 pages) sectional views of a prior art fluid end with prior art piloted-gunsight spring retainer", publicly available prior to Oct. 5, 2012.

"Item C (2 pages), sectional views of a prior art fluid end with prior art cage stylespring retainer", publicly available prior to Oct. 5, 2012.

"Limited Statement of Prior Art Regarding Figures 1-9 (1page)".

Office Action from the United States Patent and Trademark Office for U.S. Appl. No. 13/646,170 dated Jun. 30, 2015 (16 pages).

* cited by examiner

FLUID END OF A HIGH PRESSURE PLUNGER PUMP

FIELD

The present disclosure concerns a tapered groove in a high pressure plunger pump; the groove receives a spring retainer; the spring retainer at a first portion and a second portion is carried in the groove; the groove is configured to prevent the retainer from moving out of the groove along the long axis of the suction bore.

BACKGROUND

Spring retainers for suction valves in high pressure plunger pumps are known. U.S. Pat. No. 7,186,097, Blume, discloses suction valve spring retainers. The retainers are for use in plunger pump housings incorporating structural features for stress relief. These pump housing structural features accommodate access bore plugs that secure suction valve spring retainers that are internally located substantially centrally over the suction bore transition area of the plunger pump housing. Access bore plugs are secured in place on the pump housing one or more threaded retainers. Plunger pumps so constructed are relatively resistant to fatigue failure because of stress reducing structural features, and they may incorporate a variety of valve styles, including top and lower stem-guided valves and crow-foot-guided valves in easily-maintained configuration. Suction valve spring retainers mounted in plunger pump housings may also incorporate a suction valve top stem-guide. Further, certain structural features of access bore plugs may be dimensioned to aid in improving volumetric efficiency of the pumps in which they are used.

U.S. Pat. No. 6,910,871, Blume, discloses valve guide and spring retainer assemblies for use in plunger pump housings that incorporate features for stress relief. These pump housings have structural features to accommodate correspondingly shaped valve guides and/or spring retainers that are internally fixed in place using one or more non-threaded spacers.

U.S. Pat. No. 6,544,012, Blume, discloses a Y-block fluid section plunger pump housing having a cylinder bore which is transversely elongated at its intersection with suction and discharge bores to provide stress relief and reduction in housing weight. A spoked, ring valve spring retainer further reduces stress near the bore intersection and allows use of a top stem guided suction valve. Tapered cartridge packing assemblies facilitate use of a one-piece plunger in Y-block housings and also allow packing in such housings to be changed without removing the plunger

SUMMARY

One aspect of the invention is embodied by a fluid end of a plunger pump that has a plunger bore, discharge bore, suction bore, valve cover bore, and cross-bore intersection formed in portions of the fluid end. Each of the above named bores has an axis. A plunger bore transition area is at an opening of the plunger bore and also adjacent the cross-bore intersection. A valve cover bore transition area is at an opening of the valve cover bore and also adjacent the cross-bore intersection. The plunger bore and valve cover bore openings open into the cross-bore intersection. The discharge bore and suction bore each have an opening which opens into said cross-bore intersection. The suction bore axis extends through the opening of the discharge bore which opens into said cross-bore intersection. The discharge bore axis extends through the opening of the suction bore which opens into said cross-bore intersection. The valve cover bore axis extends into the opening of the plunger bore which opens into the cross-bore intersection.

The fluid end further has a groove. The groove traverses a curvilinear path around an open space. The discharge bore and suction bore axes each extend into said open space. The groove has a first section and a second section. The first section has a first end with a first opening and a second end. The second section has a first end. The second section has a second end with an opening. The first and second sections each have a closed base opposite and an open side of each section. The first and second sections each have a first angled surface and a second angled surface. The first angled surface and second angled surface of the first section converge towards each other towards the base of the first section. The angle formed between the first angled surface and second angled surface of the first section is greater than 90 degree and less than 180 degree. The first angled surface and second angled surface of the second section converge towards each other towards the base of the second section. The angle formed between the first angled surface and second angled surface of the second section is greater than 90 degree and less than 180 degree. A gap is between said first ends of said first and second sections of the groove. A gap is between the second ends of said first and second sections of the groove.

A further aspect of the invention is characterized in that the plunger bore transition area is between and coplanar with the first end of the first section of the groove and the first end of the second section of the groove. The valve cover bore transition area is between and coplanar with the second end of the first section of the groove and the second end of the second section of the groove.

Yet in another aspect of the invention a first portion of a spring retainer is in the first section of the groove and a second portion of the spring retainer is in the second section of said groove.

Another aspect of the invention is embodied in a spring retainer. The retainer has a first portion having a first side with a first surface and a second surface. The first portion has a second side with a third surface. The first surface is angled relative to the second surface. The exterior angle formed by the surfaces is greater than 180 degree and less than 270 degree. The retainer has a second portion. The second portion has a first side with a first surface and a second surface. The second portion has a second side with a third surface. The first surface of the second portion is angled relative to the second surface of the second portion. The exterior angle formed by the surfaces is greater than 180 degree and less than 270 degree.

The retainer further has a base portion from which the first portion extends and the second portion extends. The base portion has a first surface on a first side of the base portion. The base portion has a second surface on a second side of the base. The second side is opposite the first side. The third surface of the retainer first portion is angled relative to the base second surface. The angle is greater than 90 degree and less than 180 degree. The first surface of the retainer first portion is angled relative to the base first surface. The exterior angle formed by the surfaces is between 180 degree and 270 degree. The third surface of the retainer second portion is angled relative to the base second surface. The angle is greater than 90 degree and less than 180 degree. The first surface of the retainer second portion is angled relative to the base first surface. The exterior angle formed by the surfaces is greater than 180 degree and less than 270 degree.

In a further aspect of the invention the base of the spring retainer has a third surface. The third surface has a central portion and a first end portion angled relative to the central portion. The third surface also has a second end portion angled relative to the central portion. The angle between the first end portion and the central portion is greater than 90 degree and less than 180 degree. The angle between the central portion and the second end portion is greater than 90 degree and less than 180 degree.

The base also has a fourth surface opposite the third surface. The fourth surface has a central portion and a first end portion angled relative to the central portion. The fourth surface also has a second end portion angled relative to the central portion. The angle between the first end portion and the central portion is greater than 90 degree and less than 180 degree. The angle between the central portion and the second end portion is greater than 90 degree and less than 180 degree. The third surface is between the base first and second surfaces. The fourth surface is between the base first and second surfaces.

In one construction, a fluid end of a plunger pump includes a casing defining a plurality of working spaces. Each of the working spaces includes an inlet bore centered on an inlet bore axis, an outlet bore centered on an outlet bore axis that is coaxial with the inlet bore axis, and a plunger bore centered on a plunger axis. The plunger axis is arranged perpendicular to the inlet bore axis, the plunger axis and the inlet bore axis cooperate to define a center plane, wherein the intersection of the plunger bore and inlet bore is at least partially defined by a first curved edge completely disposed on a first side of the center plane and a second curved edge completely disposed on a second side of the center plane opposite the first side of the center plane. A first V-shaped groove is partially defined by the first curved edge and is positioned on the first side of the center plane and a second V-shaped groove is partially defined by the second curved edge and positioned on the second side of the center plane. An inlet spring retainer includes a first engagement portion and a second engagement portion, the inlet spring retainer orientable in a first orientation in which the inlet spring retainer is movable from the inlet bore to the plunger bore and a second orientation in which the inlet spring retainer engages the first curved edge and the second curved edge to inhibit movement of the inlet spring retainer from the inlet bore to the plunger bore.

In another construction, a fluid end of a plunger pump includes a casing defining a plurality of working spaces. Each of the working spaces includes an inlet bore centered on an inlet bore axis, an outlet bore centered on an outlet bore axis that is coaxial with the inlet bore axis, a plunger bore centered on a plunger axis, the plunger axis arranged perpendicular to the inlet bore axis, and a valve cover bore centered on the plunger axis. The inlet bore, the outlet bore, the plunger bore, and the valve cover bore cooperating to define a cross bore intersection space, wherein the casing defines an inlet bore transition area at the intersection of the inlet bore and the cross bore intersection space. A first V-shaped groove is formed adjacent the inlet bore transition area and extends partially around the inlet bore axis and a second V-shaped groove is formed adjacent the inlet bore transition area and extends partially around the inlet bore axis. An inlet spring retainer includes a first engagement portion and a second engagement portion. The inlet spring retainer is orientable in a first orientation in which the inlet spring retainer is movable from the inlet bore to the plunger bore and a second orientation in which the inlet spring retainer engages the first V-shaped groove and the second V-shaped groove to inhibit movement of the inlet spring retainer from the inlet bore to the cross bore intersection space.

BRIEF DESCRIPTION OF THE DRAWINGS

FIGS. 7A through 7H show various views of the spring retainer shown in FIG. 1; FIG. 7A is a top view.

DETAILED DISCLOSURE

While embodiments of this invention can take many different forms, specific embodiments thereof are shown in the drawings and will be described herein in detail with the understanding that the present disclosure is to be considered as an exemplification of the principles of the invention, and is not intended to limit the invention to the specific embodiment illustrated.

Figure 1:
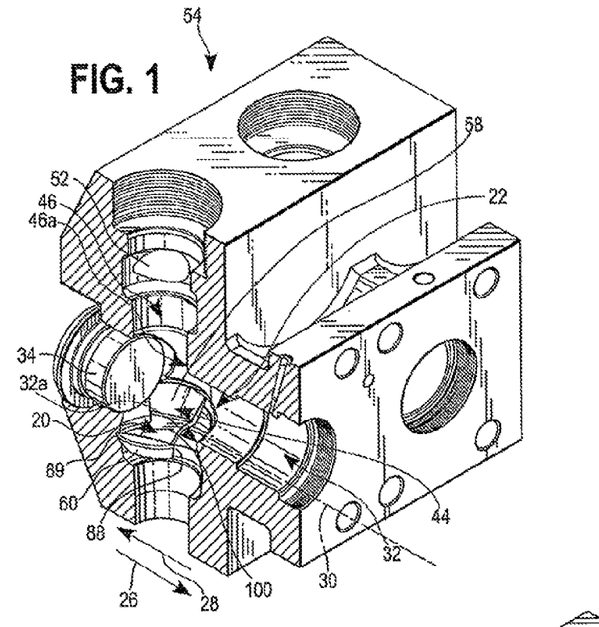
FIG. 1 is an isometric sectional view of a fluid end of a plunger pump embodying an embodiment of the present invention; wherein the section is taken through the housing of the fluid end of a plunger pump; the section being parallel to the long axis of the plunger bore, the long axis of the suction bore, and the long axis of the discharge bore; a spring retainer is disposed in and is rotatable about its central axis in the retainer groove; the view shows the spring retainer having been rotated in a first circumferential direction, counter clock-wise direction, until further rotation is prevented by abutment of a portion of the spring retainer against a portion of the valve cover; components of the fluid end have been omitted for simplicity.
Figure 2:
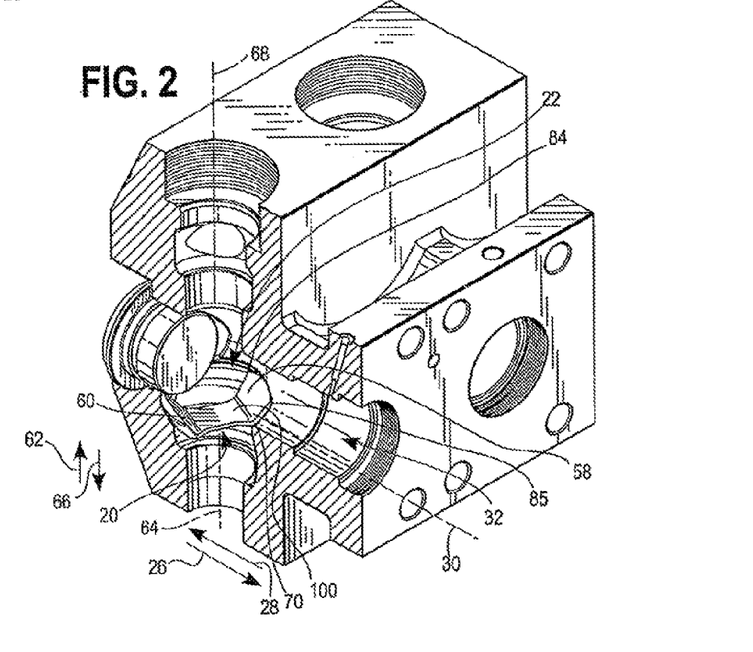
FIG. 2 is the same sectional shown in FIG. 1 except the spring retainer has been rotated in a second circumferential direction opposite from the first circumferential direction, clockwise direction, until the rotation is stopped by a portion of the spring retainer abutting up against the valve cover.
Figure 3:
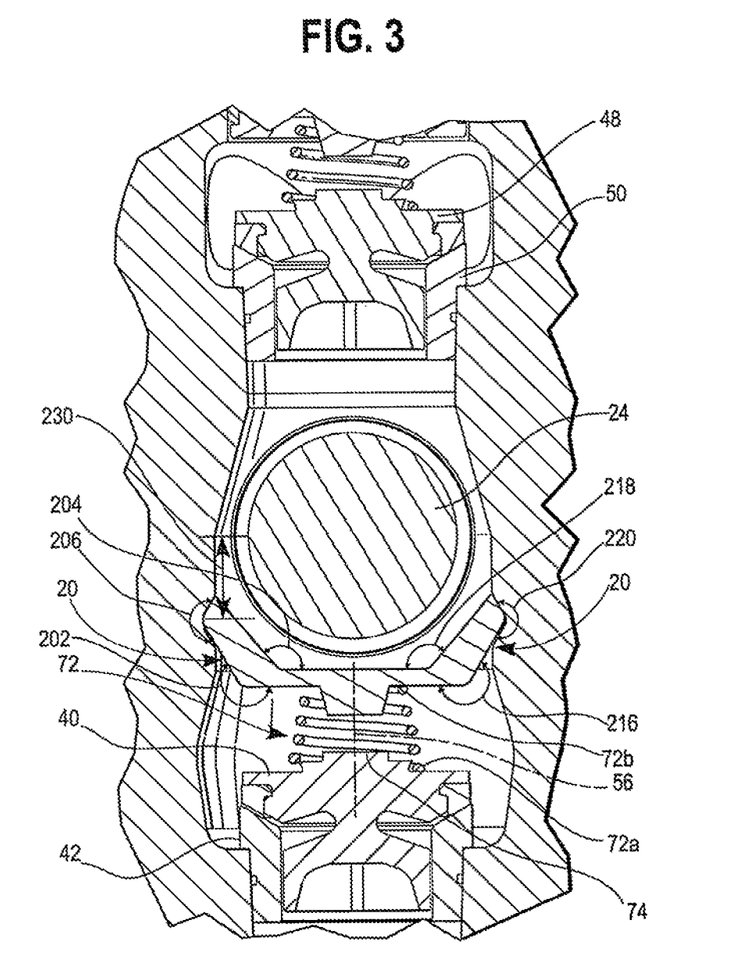
FIG. 3 is a sectional view of the fluid end of FIG. 1; the section, however, is taken perpendicular to the plunger bore and parallel to the suction and discharge bores; additionally, components of the fluid end such as the plunger, suction valve assembly and discharge valve assembly are shown; the spring retainer is shown disposed in the retainer groove holding the suction valve spring in place to bias a suction valve in the closed position against its valve seat.

With reference to FIGS. 1, 2 and 3, the general operation of the high pressure pump and the function of the retainer ring 20 and groove 22 can be understood. The retainer ring can also be called a spring retainer 20. The plunger 24 shown in FIG. 3 reciprocates in a first direction 26 and an opposite second direction 28 along the long axis 30 of the plunger bore 32. The long axis extends along the length of the plunger bore. As the plunger 24 reciprocates in the first direction 26 away from the valve cover 34, fluid is sucked into suction bore 36 through a fluid inlet 38. Suction valve 40, normally in the closed position, moves off its valve seat 42 towards the spring retainer 20. Fluid then passes over the spring retainer into the cross bore intersection 44. The plunger 24 then reciprocates in the opposite second direction 28 along the plunger bore long axis 30 toward the valve cover 34. The reciprocation causes the fluid to exit the fluid end 54 through discharge bore 46. The fluid exits the discharge bore by pushing discharge valve 48 off its valve seat 50 and exiting the discharge bore through a fluid outlet 52. As the plunger 24 reciprocates, fluid is drawn into the fluid end 54 and ejected from the fluid end 54. As can be seen the fluid end is a single monoblock piece machined from a single casting or forging.

The forces of the fluid may cause the spring retainer 20 to rotate about the retainer central axis 56. The central axis can also be called a third axis of the spring retainer. The retainer, however, is prevented by the valve cover 34 from rotating in a manner which enables the first end portion 58a of the first retainer portion 58 or the first end portion 60a of the second retainer portion 60 to be in a position such that the plunger will contact these end portions or any other portions of the retainer. The valve cover 34 extends through the valve cover bore 34a and overlaps a valve cover bore transition area 78. The valve cover transition area 78 is between a second end of first groove section 86 and a second end of a second section 90. The valve cover bore transition area 78 is coplanar with the second ends of the first and second groove sections 86, 90. The valve cover bore transition area 78 is also coplanar with groove 22. The valve cover is thus in the path of rotation of the retainer 20. The cover provides an abutment to prevent 360 degree rotation of the spring retainer in either the clockwise or counter clockwise direction.

The configuration of the groove 22 and the retainer 20 further prevent the retainer 20 from moving in a first direction 62 along the long axis 64 of the suction bore 36 towards the discharge bore 46. The configuration of the groove 22 and the retainer 20 further prevent the retainer 20 from moving in a second direction 66 along the long axis 68 of the discharge bore 46 towards the suction valve 40. This further ensures that the end portions 58a, 60a of the retainer 20 and all other portions of the retainer 20 remain outside of the pathway of the plunger 24 so that the plunger 24 does not contact the retainer 20 during its reciprocation. Therefore, the configuration of the groove 22 and the configuration of the portions of the retainer 20 in the groove 22 cooperate such that the retainer 20 will not slip out of the groove 22. The retainer will not slip out of the groove 22 in the direction 62 of the discharge valve 48 along the long axis 64 of the suction bore. It will also not slip out of the groove in the direction 66 along discharge bore long axis 68 towards the suction bore valve 40. The discharge bore long axis extends along the length of the discharge bore. The suction bore long axis extends along the length of the suction bore.

The valve cover bore, suction bore, discharge bore, and plunger bore each have an opening, 34b, 36a, 46a and 32a which opens into the cross-bore intersection 44. The valve cover bore transition area 78 is at the valve cover bore opening 34b. The plunger bore transition area 70 is at the plunger bore opening 32a. The suction bore axis 64 extends through the opening of the discharge bore opening 46a. The discharge bore axis 68 extends though the opening 36a of the suction bore. The valve cover bore central axis 34c extends through opening 32a in the plunger bore. The plunger bore axis 30 extends through opening 34b of the valve cover bore.

Referring to FIGS. 1-3 and 8 and 9 we can understand the ease with which the spring retainer 20 can be installed in the retaining groove 22. To place the spring retainer in the installed position, the suction valve 40 and valve seat 42 are installed in the suction bore 36. The valve cover 34 is not yet installed. The plunger 24 is not in the cross bore intersection 44 or overlapping the plunger bore transition area 70. Spring 72 is disposed so that one end 72a of the spring is seated on the valve 40. It is seated around the valve boss 74. The portion of the valve which supports the spring can be called a spring support. The spring retainer 20 is oriented to be placed in a first position. The first position can be called a drop in position or pre-installed position. To place the spring retainer in the first position, first retainer portion 58 of the spring retainer is aligned with the plunger bore transition 70 area so it overlaps the transition area. Simultaneously with aligning the first portion with the plunger bore transition area, second spring retainer portion 60 is aligned with the valve cover bore transition area 78 so it overlaps the transition area. Simultaneously with the alignment of the first portion with the plunger bore transition area and the second portion with the valve cover bore transition area, a boss 82 extending along the central axis 56 is aligned and inserted into an end 72b of compression spring 72. Alternatively, the boss could be a recessed area which receives the second end of the compression spring. The portion of the retainer which supports the second end of the spring can generally be called a spring support. Once the spring retainer is aligned as described above, an installer pushes the spring retainer 20 along the suction bore long axis 64 towards the suction valve 40. Pushing in the axial direction compresses the spring. The installer moves the spring retainer 20 in the axial direction towards the suction valve 40 until an abutment between retainer first portion 58 and the plunger transition area 70 and retainer second portion 60 and valve cover bore transition area 78 prevent further axial movement of the spring retainer 20. The valve cover and plunger transition areas 70,78 can be called transition edges. The edges are rounded. The installer then rotates the spring retainer about its central axis such that a leading edge 84 of the first retainer portion 58 of the retainer is brought to be adjacent an opening 22a of the groove. The opening 22a is at the first end of the first groove section 86. The rotation also causes a leading edge 88 of the retainer second portion 60 to be adjacent the opening 22b in the groove 22. The opening is at the second end of the second groove section 90. During rotation, the installer maintains the spring retainer 20 so its first portion 58 is abutted by the plunger bore transition area 70 and its second portion 60 is abutted by the valve cover bore transition area 78. The retainer 20 is as axially close to the suction valve 40 as permitted by the construction of the transition areas 70, 78 and retainer groove 22. Immediately prior to insertion of the first end portion 58a of the retainer first portion 58, which includes the leading edge 84, into the opening 22a at the first end of the first groove section 86, the spring retainer 20 can be said to be in an aligned position. Also immediately prior to insertion of the first end portion 60a of the retainer second portion 60, which includes the leading edge 88 of the second portion 60, into the opening 22b at the second end of the second section 90, the spring retainer 20 can be said to be in the aligned position. The aligned first position can also be called the aligned drop in position or the aligned pre-installation position. Additionally in the aligned position, a portion of the first side surface 76a of the retainer first portion 58 is in axial alignment with a first surface 23a of the first section 86 of the retaining groove 22. The first surface 23a of the first section 86 of the retaining groove 22 is angled. Additionally, at least a portion of a second side surface 76b of the retainer first portion 58 is in axial alignment with a second surface 23b of the first section 86 of the retaining groove 22. The second surface 23b is angled. The first side surface 76a and second side surface 76b are angled. The spring retainer in the aligned position is also oriented such a portion of the first side surface 80a of the second portion 60 of the spring retainer 20 is in axial alignment with the first surface 23a of the second section 90 of the retaining groove 22. Additionally, at least a portion of a second side surface 80b of the retainer second portion 60 is in axial alignment with the second surface 23b of the second section 90 of the retaining groove. The first side surface 80a, and second side surface 80b are angled.

Figure 8:
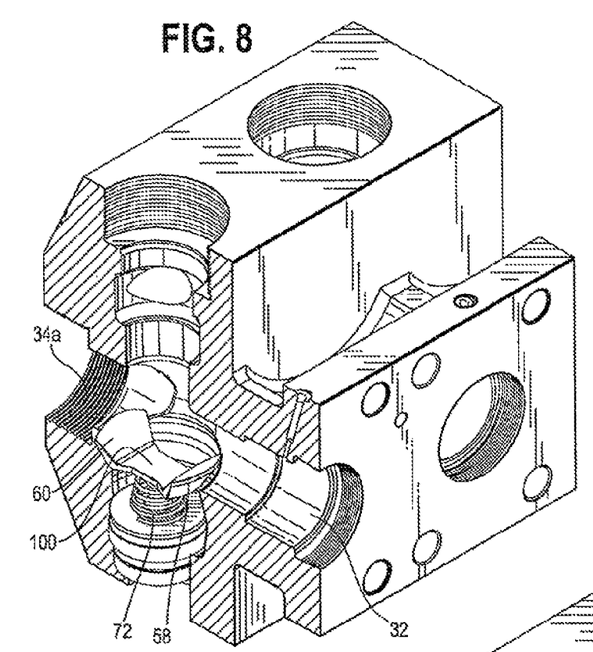
FIG. 8 is an isometric sectional view of the fluid end shown in FIG. 4A wherein the spring retainer is aligned so that a first retainer portion is disposed between the first ends of the first and second groove sections; a second retainer portion is disposed between the second ends of the first and second groove sections; the first retainer portion is seating against the plunger bore transition area; the second retainer portion is seating against the valve cover bore transition area; the valve cover is not present; the retainer spring is compressed.
Figure 9:
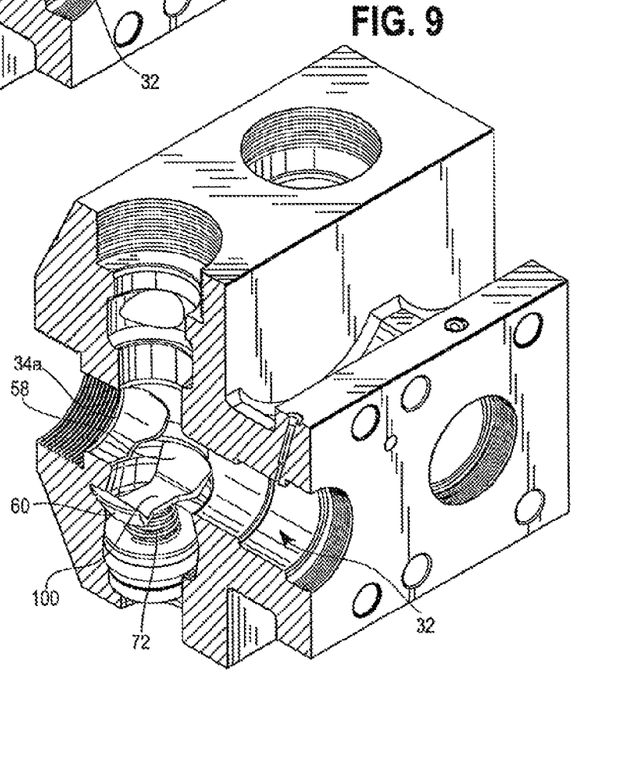
FIG. 9 is a cutaway isometric sectional view of the fluid end shown in FIG. 8 wherein the spring coupled to the spring retainer and valve is compressed; the valve is in the closed position; the spring has been rotated to an installed position where the retainer's long axis is perpendicular to the plunger bore axis.

From the alignment position the spring retainer is rotated to its installed position. It is rotated so that the retainers long axis is perpendicular to the plunger bore axis. In the installed position, a portion of the first side surface 76a of the retainer first portion 58 overlaps said groove first surface 23a and at least partially contacts said surface. The second side surface 76b of the first retainer portion 58 overlaps and at least partially contacts said second surface 23b of the groove.

Further, a rounded transition area 76c between the first side surface 76a and the second side surface 76b of the retainer first portion 58 overlaps a rounded transition area 23c between the groove first surface 23a and groove second surface 23b. The transition areas may contact each other. The first and second side surfaces 76a and 76b of the first portion 58 of the retainer are at the first side 76 of the first portion 58. The first and second side surfaces can also be called first and second surfaces. The first groove section 86 forms a portion of the groove 22 overlapped by the first side surface 76a, second side surface 76b, and rounded transition area 76c of the first retainer portion 58.

Also in the installed position, a portion of the retainer first side surface 80a of the retainer second portion 60 overlaps said groove first surface 23a and at least partially contacts said surface. The second side surface 80b of the retainer second portion 60 overlaps and at least partially contacts said second surface 23b of the groove. Further, a rounded transition 80c area between the first side surface 80a and the second side surface 80b of the retainer second portion overlaps 60 the rounded transition area 23c between the groove first surface 23a and groove second surface 23b. The transition areas may contact each other. The second groove section 90 forms a portion of the groove overlapped by the first side surface 80a, second side surface 80b, and rounded transition area 80c of the second retainer portion 60. The first and second side surfaces 80a and 80b of the second portion 60 of the retainer are at the first side 80 of the second portion 60. The first and second side surfaces can also be called first and second surfaces. Once the retainer is in the installed position the valve cover 34 is installed. The plunger 24 may also be allowed to reciprocate freely in the plunger bore.

Figure 4A:
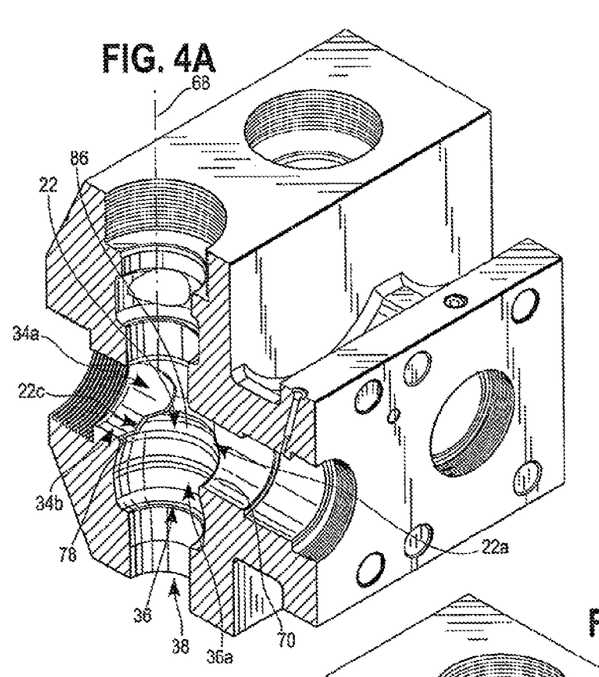
FIG. 4A is an isometric sectional view of the fluid end shown in FIG. 1, wherein the spring retainer and valve cover have been omitted from the view; the view shows a first section of the retaining groove extending between the transition area of the plunger bore and the transition area of the valve cover bore.
Figure 4B:
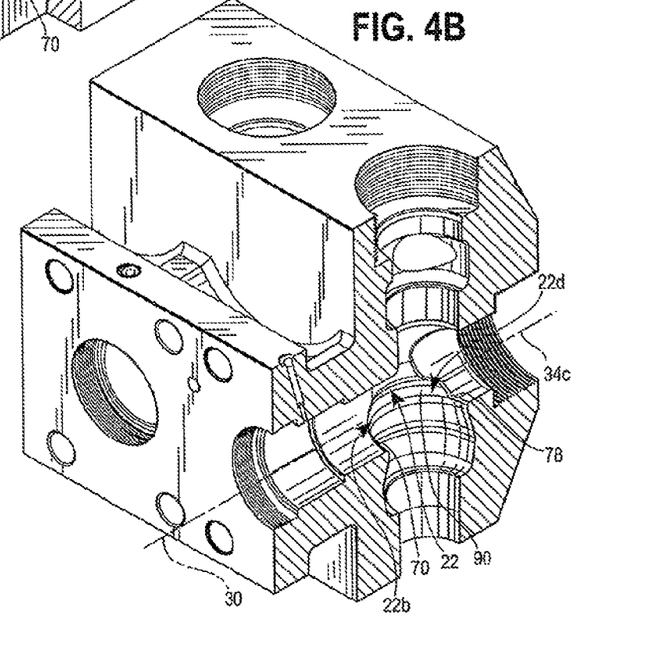
FIG. 4B is an isometric sectional view of the fluid end shown in FIG. 1, wherein the spring retainer and valve cover have been omitted from the view; the view shows a second section of the retaining groove, radially opposite the first section of the retaining groove, extending between the transition area of the plunger bore and the transition area of the valve cover bore.
Figure 4C:
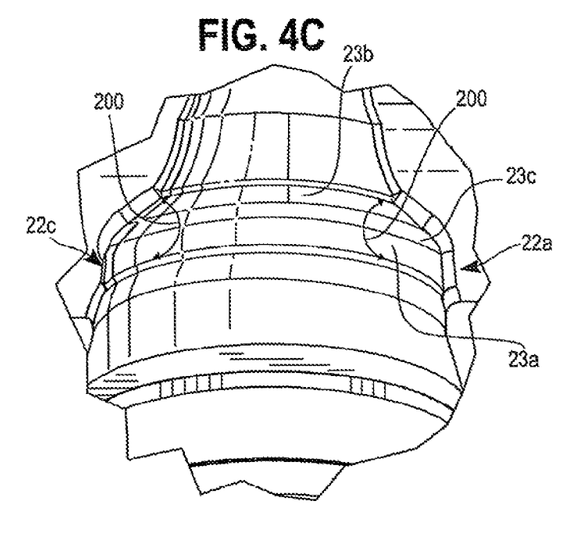
FIGS. 4C is and 4D are blow ups of the details of FIGS. 4A and 4B respectively; the detail shows that the retaining groove has a first surface angled in a first direction, a second surface angled in a second different direction and a rounded transition area joining the first surface to the second surface at a base of the groove; opposite the base of the groove is an open side.
Figure 4D:
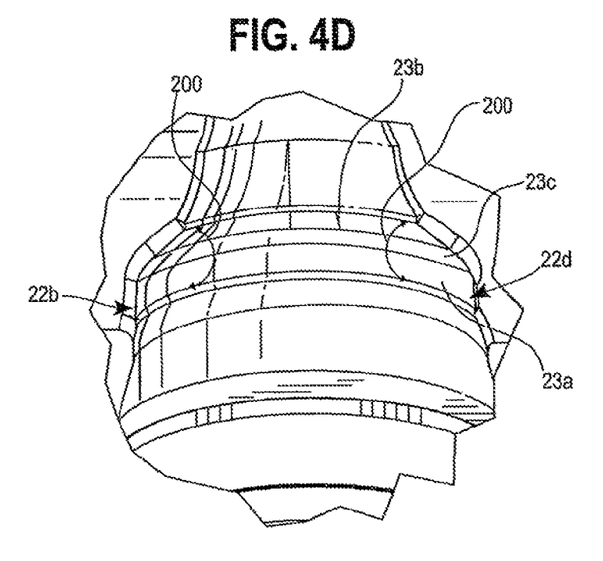

In more detail, the retainer groove 20, as stated has a first section 86 and a second section 90. The first section has a first end with opening 22a that opens into the plunger bore transition area 70. The first section 86 has second end with a second opening 22c which opens into the valve cover bore transition area 78. The valve cover bore transition area 78 can also be called the valve bore transition edge. The groove first section 86 has first surface 23a which can be called a first angled surface. The groove first section 86 has second surface 23b which can be called the second angled surface. The second angled surface and the first angled surface converge towards each other towards the base of the groove. The angle 200 formed between the groove first surface 23a and second surface 23b is greater than 90 degree and less than 180 degree. More usually the angle is greater than 100 degree and less than 150 degree. The angle is preferably 120 degree for plunger sizes from 3.75 up to 6.75 inches in diameter. The base of the groove is closed. At the base of the groove is the transition area 23c which joins an end of the first surface 23a to an end of the second surface 23b. As known in the art the fluid end changes in size and dimension as the plunger size changes. The transition area 23c is a rounded surface and has a valley.

The second groove section 90 is of the same construction as the first groove section 86. The second groove section has a first end that has a first opening 22d that opens into the plunger bore transition area 70. The second section 90 has a second end with second opening 22b which opens into the valve cover bore transition area 78. The groove second section 90 has first surface 23a which can be called first angled surface. The groove second section 90 has second surface 23b which can be called the second angled surface. The second surface 23b and the first surface 23a converge towards each other towards the base of the groove. The angle 200 formed between the groove first surface 23a and second surface 23b is between 90 degree and 180 degree.

The base of the groove is closed. At the base of the groove is the transition surface 23c which joins an end of the first angled surface 23a to an end of the second angled surface 23b. The transition area is rounded and has a valley. Although the first angled surface, second angled surface and rounded transition area of the first and second groove sections 86 and 90 are the same in terms of construction and dimension it is possible they could be different.

Figure 5:
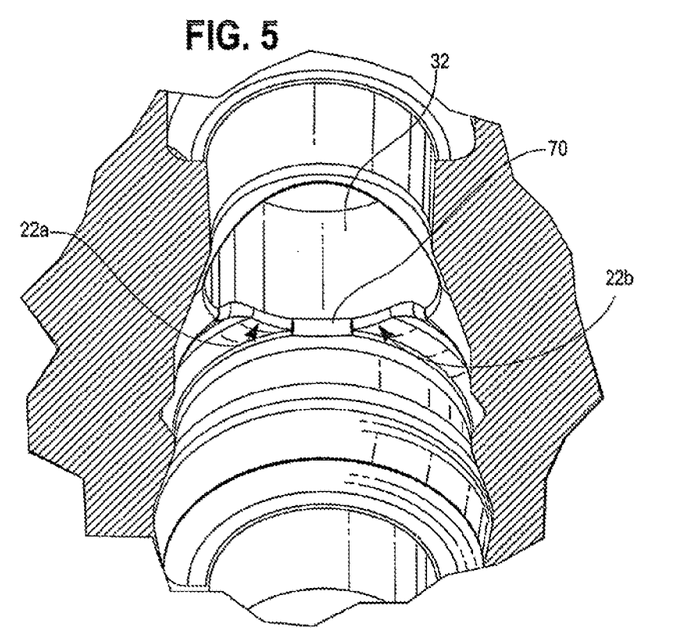
FIG. 5 is a sectional view of the fluid end shown in FIG. 1, wherein the spring retainer and valve cover have been omitted; the view shows the retainer groove first section and second section wherein the plunger bore has a transition area which is between a first end of the first section and a second end of the second section thereby providing a break, gap or discontinuity between the retaining groove first section and the retaining groove second section; the gap is between the first and second section first ends.
Figure 6:
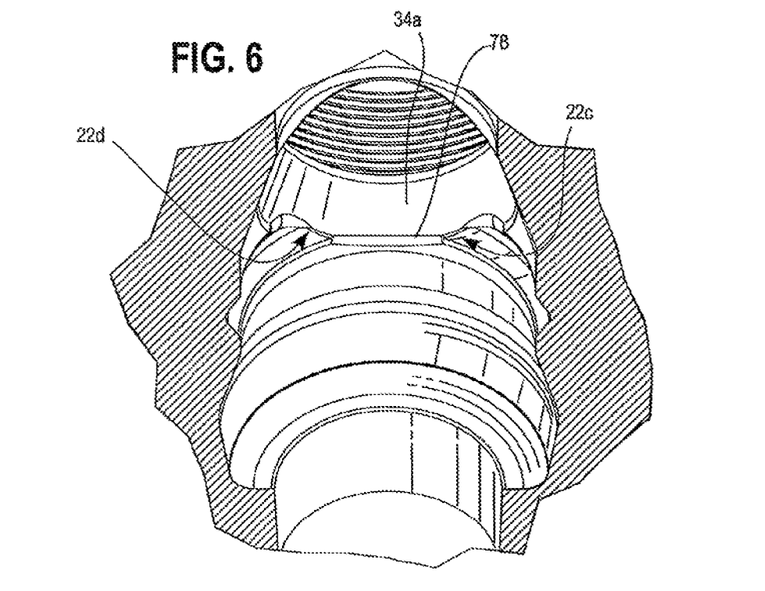
FIG. 6 is a sectional view of the fluid end shown in FIG. 5 wherein the spring retainer and valve cover have been omitted; the view shows the retainer groove first section and second section wherein the valve cover bore has a transition area which is between the first section and the second section thereby providing a break, gap or discontinuity between the retaining groove first section and the retaining groove second section; the gap is between the first and second section second ends.
Figure 7A:
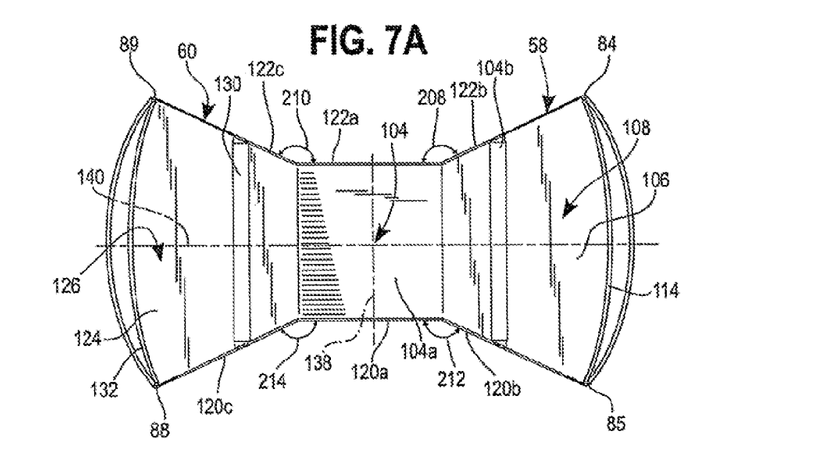
Figure 7B:
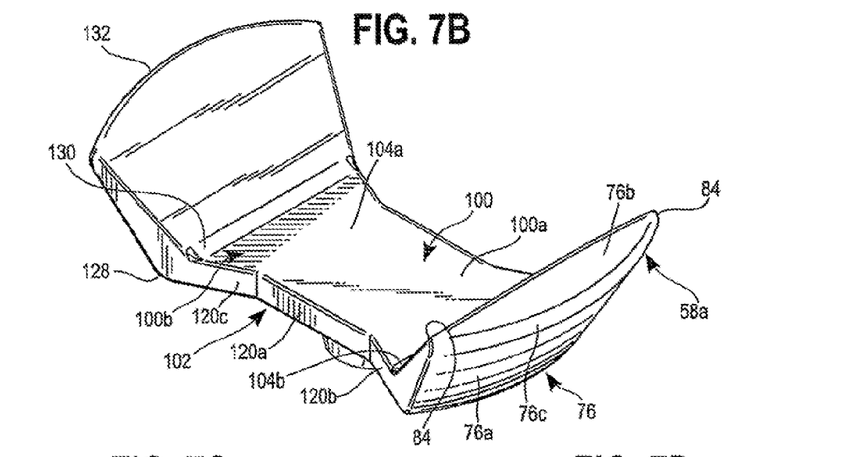
FIG. 7B is a right-sided isometric view.
Figure 7C:
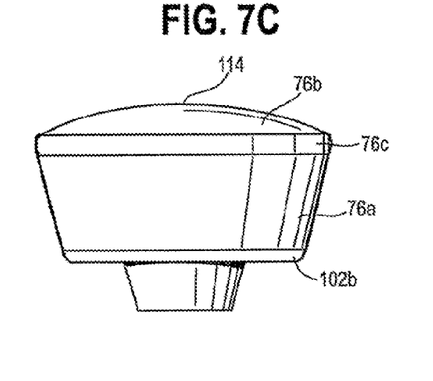
FIG. 7C is a right-sided view.
Figure 7D:
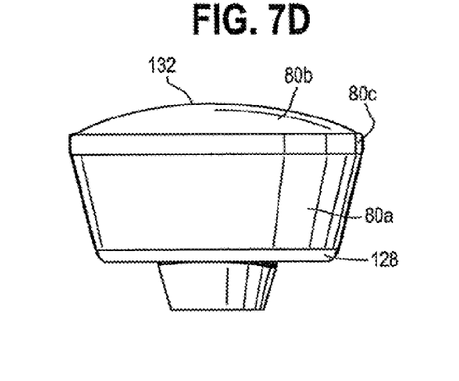
FIG. 7D is a left-sided view.
Figure 7E:
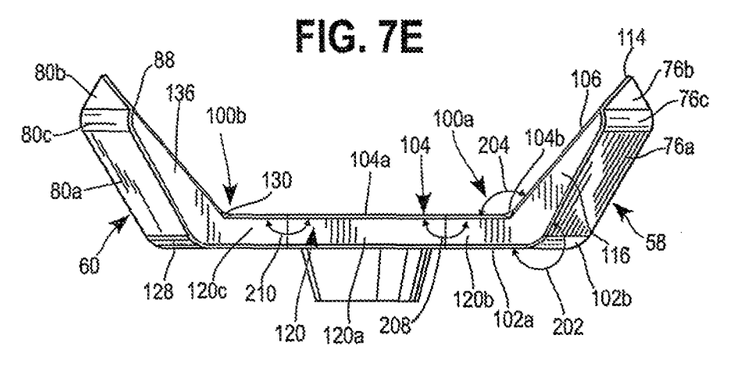
FIG. 7E is a front-side view.
Figure 7F:
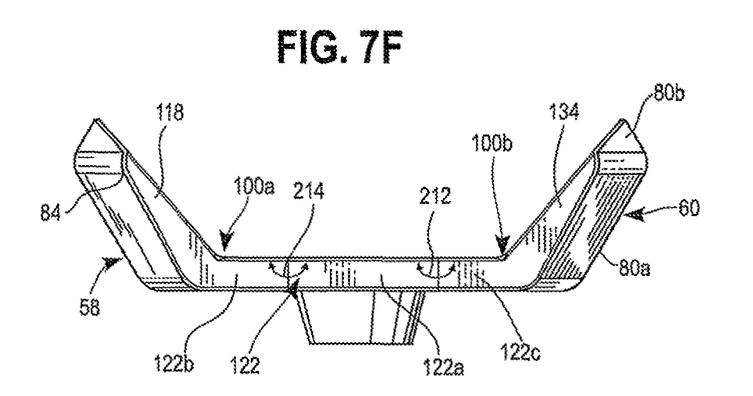
FIG. 7F is a back-side view.
Figure 7G:
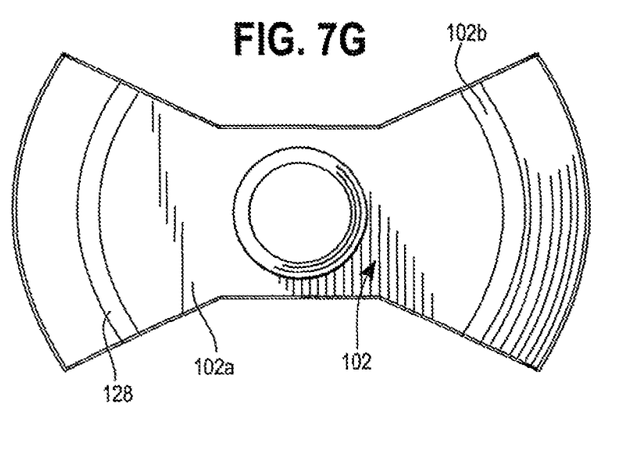
FIG. 7G is a bottom view.
Figure 7H:
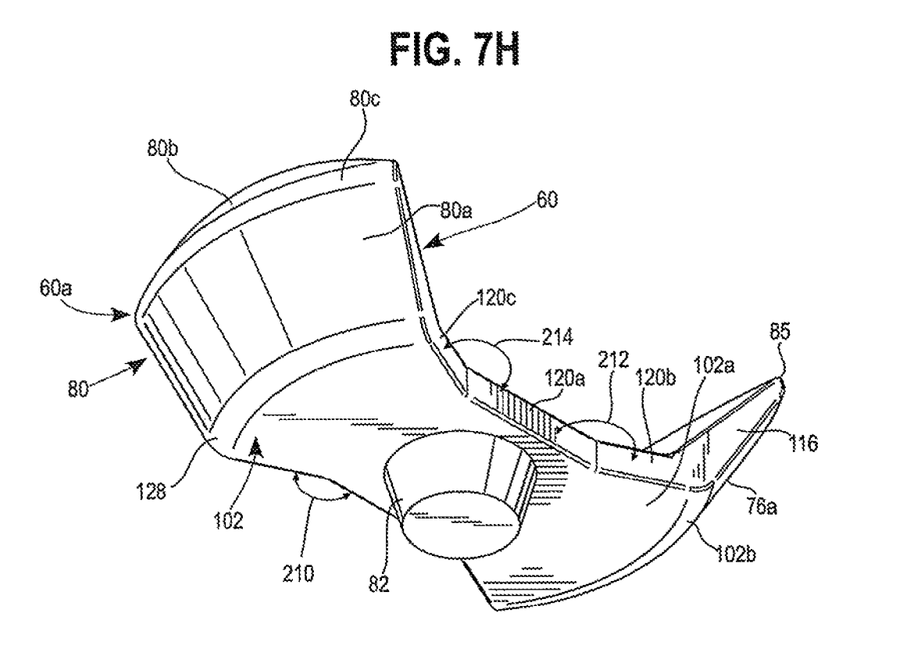
FIG. 7H is a left-side isometric view.

Notably the plunger bore transition area is between and coplanar with the first end of the first section 86 of the groove 22 and the first end of the second section 90 of the groove. The plunger bore transition area provides a groove-less gap formed as a rounded surface between the first ends. Also the valve cover bore transition area 78 is between and coplanar with the second end of the first section 86 of the groove 22 and the second end of the second section 90 of the groove 22. The valve cover bore transition area 78 provides a groove-less gap formed as a rounded surface between the second ends.

As can be seen in FIGS. 7A-7H, the retainer 20 has a unique construction. The retainer is a single monoblock piece which can be made from a single casting without machining or machined from a cylindrical bar forging. As stated, the retainer has a first portion 58 and a second portion 60. The first portion extends from a base portion 100 at a first end 100a of said base 100. The second portion 60 extends from the base 100 portion at a second end of said base 100b. The base portion has a first surface 102a on a first side 102 of the base. The base first surface 102a is flat. The base portion has a second surface 104a on a second side 104 of the base. The base second surface is flat. The second side is opposite the first side. The first portion 58 of the retainer extending from the base 100 is angled relative to the base. The exterior angle 202 is greater than 180 degree and less than 270 degree. More usually the angle is greater than 200 degree and less than 250 degree. The angle is preferably 240 degree. for plunger sizes from 3.75 up to 6.75 inches in diameter. The retainer first portion 58 has a third surface 106 at a second side 108 of the first portion 58. The third surface 106 is angled relative to the base second side surface 104a. The angle 204 is greater than 90 degree and less than 180 degree. More usually the angle is greater than 100 degree and less than 150 degree. The angle is preferably 123 degree for plunger sizes from 4.5 up to 6.75 inches in diameter wherein the retainer is cast and 130 degree wherein the retainer is machined. The angle is preferably 125 degree for plunger sizes 3.75 & 4 inches in diameter wherein the plunger is cast. The angle is such that a direction going from the base along the third surface towards the first end portion 58a of the first retainer portion 58 is away from the retainer's central axis 56. The first surface 76a of the first side 76 is also angled relative to the base first surface 102a. The exterior angle 202 is greater than 180 degree and less than 270 degree. More usually the angle is greater than 200 degree and less than 250 degree. The angle is preferably 240 degree for plunger sizes from 3.75 up to 6.75 inches in diameter. The surface is angled such that a direction from the base along the first surface 76a towards the first end portion 58a is away from the retainer central axis 56. The first side 76 second surface 76b is angled relative to the first surface 76a. The exterior angle 206 is greater than 180 degree and less than 270 degree. More usually the angle is greater than 200 degree and less than 250 degree. The angle is preferably 240 degree for plunger sizes from 3.75 up to 6.75 inches in diameter. The second surface is angled such that going in a direction from the first surface along the second surface towards an end edge 114 of the first end portion 58a, the direction is towards the central axis 56. The first 76a and second 76b surfaces of the retainer first side 76 are not flat. They are rather rounded. The rounded surfaces can be considered convex or arcuate. They have a peak. The transition area 76c which joins the first surface 76a to the second surface 76b is rounded. It has a peak. Further, a rounded transition area 102b with a peak joins the base first surface 102a to the first surface 76a. Also, a rounded transition area 104b with a valley joins the base second side surface 104a to the first portion, third surface 106. As stated, the retainer first portion has a leading edge 84. It also has a trailing edge 85.

The first portion 58 second surface 76b is angled towards the first portion third surface 106. At the closest point between the third and second surface, end edge 114 is formed. The end edge extends from the leading edge 84 to the trailing edge 85. It has a peak between the trailing and leading edges.

A fourth surface 116 of the retainer first portion 58 extends from the trailing edge to the base. The fourth surface 116 is bounded on one side by the third surface 106 and the opposite side by first surface 76a, second surface 76b and the transition area 76c between the first and second surfaces.

A fifth surface 118 of the retainer first portion 58 extends from the leading edge 84 to the base 100. The fifth surface is bounded on one side by the third surface 106 and the opposite side by first surface 76a, second surface 76b and the transition area 76c between the first and second surfaces.

The second portion 60 of the retainer extending from the base 100 is angled relative to the base. The exterior angle 216 is greater than 180 degree and less than 270 degree. More usually the angle is greater than 200 degree and less than 250 degree. The angle is preferably 240 degree for plunger sizes from 3.75 up to 6.75 inches in diameter. The second retainer portion 60 has a second side 126 with a third surface 124 which is angled relative to the base second side surface 104a. The angle 218 is greater than 90 degree and less than 180 degree. More usually the angle is greater than 100 degree and less than 150 degree. The angle is preferably 123 degree for plunger sizes from 4.5 up to 6.75 inches in diameter wherein the retainer is cast and 130 degree wherein the retainer is machined. The angle is preferably 125 degree for plunger sizes 3.75 & 4 inches in diameters wherein the retainer is cast. The angle is such that a direction going from the base along the third surface towards the first end portion 60a of the retainer second portion 60 is angled away from the retainer's central axis 56. The retainer second portion's first surface 80a is also angled relative to the base first surface 102a. The exterior angle 216 is greater than 180 degree and less than 270 degree. More usually the angle is greater than 200 degree and less than 250 degree. The angle is preferably 240 degree for plunger sizes from 3.75 up to 6.75 inches in diameter. The surface is angled such that a direction from the base along the first surface 80a towards the first end portion 60a of the retainer second portion 60 is away from the retainer central axis 56. The retainer second portion's second surface 80b is angled relative to the first surface 80a. The exterior angle 220 is greater than 180 degree and less than 270 degree. More usually the angle is greater than 200 degree and less than 250 degree. The angle is preferably 240 degree for plunger sizes from 3.75 up to 6.75 inches in diameter. The second surface is angled such that going in a direction from the first surface along the second surface towards an end edge 132 of the first end portion 60a, the direction is towards the central axis 56. The first 80a and second 80b surfaces of the retainer second portion 60 are not flat. They are rather rounded. The rounded surfaces can be considered convex or arcuate. They have a peak. The transition area 80c which joins the first surface to the second surface is rounded. It has a peak. Further, a rounded transition area 128 which has a peak joins the base first surface 102a to the first surface 80a. Also, a rounded transition area 130 with a valley joins the base second side surface 104a to the third surface 124 of the retainer second portion. As stated, the retainer second portion has a leading edge 88. It also has a trailing edge 89.

The second surface 80b of the retainer second portion is angled towards the third surface 124 of the retainer second portion. At the closest point between the third surface and second surface end edge 132 is formed. The end edge extends from the leading edge 88 to the trailing edge 89. It has a peak between the trailing 89 and leading 88 edges.

A fourth side surface 134 of the retainer second portion 60 extends from the trailing edge 89 to the base 100. The fourth side surface 134 is bounded on one side by the third surface 124 and the opposite side by first surface 80a, second surface 80b and the transition area 80c between the first and second surfaces.

A fifth side surface 136 of the retainer second portion 60 extends from the leading edge 88 to the base 100. The fifth side surface 136 is bounded on one side by the third surface 124 and on an opposite side by first surface 80a, second surface 80b and the transition area 80c between the first and second surfaces.

The base has a third surface 120 and an opposite fourth surface 122. The fourth surface is between the base first 102a and second 104a surface. The third surface, opposite the fourth surface, is between the base first and second surface. The fourth surface has a central portion 122a and a first end portion 122b angled relative to the central portion and a second end portion 122c angled relative to the central portion. The angle 208 between the first end portion and the central portion is between 90 degree and 180 degree. The angle 210 between the central portion and the second end portion is between 90 degree and 180 degree. The angles between the first portion and central portion and the second portion and central portion are the same and more usually the angles 208, 210 are greater than 100 degree and less than 150 degree. The angles 208, 210 are preferably 155 degree for plunger bore sizes from 3.75 up to 6.75 inches in diameter.

The third surface of the base has a central portion 120a and a first end portion 120b angled relative to the central portion and a second end portion 120c angled relative to the central portion. The angle 212 between the first end portion 120b and the central portion 120a is between 90 degree and 180 degree. The angle 214 between the central portion 120a and the second end portion 120c is between 90 degree and 180 degree. The angles between the first portion and central portion and the second portion and central portion are the same and more usually the angles 212, 214 are greater than 100 degree and less than 150 degree. The angles 212, 214 are preferably 155 degree for plunger bore sizes from 3.75 up to 6.75 inches in diameter. The angles 208, 210, 212, 214 help ensure the retainer properly abuts up against the valve cover as it tries to turn in either rotational direction.

Spring receiving boss 82 extends outward from the base 100 first side surface 102a along the retainer central axis 56.

Notably the base third surface 120 is integral with the fourth surface 116 of the first 58 retainer portion and the fifth surface 136 of the second 60 retainer portions. The base fourth surface 122 is integral with the fifth surface 118 of the first retainer portion and the fourth surface 134 of the second retainer portion.

In addition to a central axis, the retainer has a second, short axis 138, extending through the base third and fourth surfaces. It also has a first, long axis 140, extending through the end at the end edge 114 of the retainer first portion 58 and the end at the end edge 132 of the retainer second portion 60. The first axis is perpendicular to the second axis and central or third axis 56. The third axis is perpendicular to the second axis. The second axis extends along a width of the retainer. The first axis extends along a length of the retainer. The length is at least twice the width.

The distance 230, wherein the distance is taken along the direction of the suction bore axis, between the plunger's long axis and rounded transition portion 23c as shown in FIG. 3 is 1.58 inch for plunger sizes 3.75 & 4 inches, 1.88 inch for plunger sizes 4.5 & 5 inches, 2.13 inch for plunger sizes 5.5 & 6 inches and 2.39 inch for plunger sizes 6.5 & 6.75 inches.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A fluid end of a plunger pump comprising:
   a casing defining at least one working space, the at least one working space comprising:
   an inlet bore centered on an inlet bore axis;
   an outlet bore centered on an outlet bore axis that is coaxial with the inlet bore axis;
   a plunger bore centered on a plunger axis, the plunger axis arranged perpendicular to the inlet bore axis, the plunger axis and the inlet bore axis cooperating to define a center plane, wherein the intersection of the plunger bore and inlet bore is at least partially defined by a first curved edge completely disposed on a first side of the center plane and a second curved edge completely disposed on a second side of the center plane opposite the first side of the center plane;
   a first V-shaped groove partially defined by the first curved edge and positioned on the first side of the center plane and a second V-shaped groove partially defined by the second curved edge and positioned on the second side of the center plane, the first V-shaped groove and the first V-shaped groove and the second V-shaped groove each comprise an upper surface and a lower surface that intersect at a fillet, the upper surface and the lower surface of the first V-shaped groove and the second V-shaped groove defining an exterior angle between 180 degrees and 270 degrees; and an inlet spring retainer including a first engagement portion and a second engagement portion, the inlet spring retainer orientable in a first orientation in which the inlet spring retainer is movable from the inlet bore to the plunger bore and a second orientation in which the inlet spring retainer engages the first curved edge and the second curved edge to inhibit movement of the inlet spring retainer from the inlet bore to the plunger bore.

2. The fluid end of claim 1, wherein the first engagement portion of the inlet spring retainer comprises a first side surface and a second side surface arranged to engage the first V-shaped groove.

3. The fluid end of claim 2, wherein the first side surface is non-planar and the second side surface is non-planar.

4. The fluid end of claim 2, wherein the first side surface engages the upper surface and the second side surface engages the lower surface.

5. A fluid end of a plunger pump comprising:
a casing defining at least one working space, the at least one working space comprising:
an inlet bore centered on an inlet bore axis;
an outlet bore centered on an outlet bore axis that is coaxial with the inlet bore axis;
a plunger bore centered on a plunger axis, the plunger axis arranged perpendicular to the inlet bore axis;
a valve cover bore centered on the plunger axis, the inlet bore, the outlet bore, the plunger bore, and the valve cover bore cooperating to define a cross bore intersection space, wherein the casing defines an inlet bore transition area at the intersection of the inlet bore and the cross bore intersection space;
a first V-shaped groove formed adjacent the inlet bore transition area and extending partially around the inlet bore axis;
a second V-shaped groove formed adjacent the inlet bore transition area and extending partially around the inlet bore axis, the first V-shaped groove and the first V-shaped groove and the second V-shaped groove each comprise an upper surface and a lower surface that intersect at a fillet, the upper surface and the lower surface of the first V-shaped groove and the second V-shaped groove defining an exterior angle between 180 degrees and 270 degrees; and
an inlet spring retainer including a first engagement portion and a second engagement portion, the inlet spring retainer orientable in a first orientation in which the inlet spring retainer is movable from the inlet bore to the plunger bore and a second orientation in which the inlet spring retainer engages the first V-shaped groove and the second V-shaped groove to inhibit movement of the inlet spring retainer from the inlet bore to the cross bore intersection space.

6. The fluid end of claim 5, wherein the first engagement portion of the inlet spring retainer comprises a first side surface and a second side surface arranged to engage the first V-shaped groove.

7. The fluid end of claim 6, wherein the first side surface is non-planar and the second side surface is non-planar.

8. The fluid end of claim 6, wherein the first side surface engages the upper surface and the second side surface engages the lower surface.

* * * * *